(12) United States Patent
Dawkins et al.

(10) Patent No.: US 9,292,533 B2
(45) Date of Patent: Mar. 22, 2016

(54) SYSTEMS AND METHODS FOR IMPROVING STORAGE EFFICIENCY IN AN INFORMATION HANDLING SYSTEM

(75) Inventors: William Price Dawkins, Jonestown, TX (US); Stephen Gouze Luning, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 12/796,073

(22) Filed: Jun. 8, 2010

(65) Prior Publication Data

US 2011/0302137 A1 Dec. 8, 2011

(51) Int. Cl.
*G06F 17/30* (2006.01)
*G06F 11/20* (2006.01)

(52) U.S. Cl.
CPC ...... *G06F 17/30159* (2013.01); *G06F 11/2094* (2013.01); *G06F 2201/81* (2013.01)

(58) Field of Classification Search
CPC .................................. G06F 17/30; G06F 17/00
See application file for complete search history.

(56) References Cited

U.S. PATENT DOCUMENTS

| | | | | |
|---|---|---|---|---|
| 3,913,070 A | * | 10/1975 | Malcolm et al. | 718/104 |
| 3,916,383 A | * | 10/1975 | Malcolm | 718/104 |
| 4,031,517 A | * | 6/1977 | Hirtle | 703/24 |
| 4,145,739 A | * | 3/1979 | Dunning et al. | 709/211 |
| 4,378,590 A | * | 3/1983 | Kim | 718/104 |
| 4,384,324 A | * | 5/1983 | Kim et al. | 712/242 |
| 4,392,200 A | * | 7/1983 | Arulpragasam et al. | 711/140 |
| 4,393,459 A | * | 7/1983 | Huntley et al. | 711/152 |
| 4,484,273 A | * | 11/1984 | Stiffler et al. | 710/110 |
| 4,493,019 A | * | 1/1985 | Kim et al. | 712/230 |
| 4,542,458 A | * | 9/1985 | Kitajima et al. | 718/104 |
| 4,550,368 A | * | 10/1985 | Bechtolsheim | 711/206 |
| 4,574,350 A | * | 3/1986 | Starr | 710/200 |
| 4,587,609 A | * | 5/1986 | Boudreau et al. | 710/200 |
| 4,594,657 A | * | 6/1986 | Byrns | 710/241 |
| 4,617,625 A | * | 10/1986 | Nagashima et al. | 712/4 |
| 4,633,434 A | * | 12/1986 | Scheuneman | 713/400 |
| 4,648,031 A | * | 3/1987 | Jenner | 714/10 |
| 4,652,993 A | * | 3/1987 | Scheuneman et al. | 711/151 |
| 4,658,359 A | * | 4/1987 | Palatucci et al. | 701/14 |
| 4,682,284 A | * | 7/1987 | Schrofer | 710/55 |

(Continued)

OTHER PUBLICATIONS

You, Lawrence L., Kristal T. Pollack, and Darrell DE Long. "Deep Store: An archival storage system architecture." Data Engineering, 2005. ICDE 2005. Proceedings. 21st International Conference on. IEEE, 2005, pp. 1-12 (12 total pages).*

(Continued)

*Primary Examiner* — Farhan Syed
(74) *Attorney, Agent, or Firm* — Baker Botts L.L.P.

(57) ABSTRACT

Systems and methods for improving storage efficiency in an information handling system are provided. In some embodiments, an information handling system including an increased storage efficiency is provided. The information handling system may include a processor associated with a first storage resource and a plurality of second storage resources, where the first storage resource is more reliable than the plurality of second storage resources. The processor may be configured to determine a weight of a file portion, determine a number of copies of the file portion to be stored based at least on the determined weight, and store a copy of the file portion on the first storage resource if the determined number of copies of the file portion is greater than a predetermined storage threshold.

17 Claims, 2 Drawing Sheets

(56) References Cited

U.S. PATENT DOCUMENTS

| | | | | |
|---|---|---|---|---|
| 4,736,374 | A * | 4/1988 | Kump et al. | 714/32 |
| 4,760,545 | A * | 7/1988 | Inagami et al. | 712/4 |
| 4,780,822 | A * | 10/1988 | Miller | 710/241 |
| 5,930,763 | A * | 7/1999 | Kaneko | G06Q 10/06 705/7.25 |
| 6,880,101 | B2 * | 4/2005 | Golasky | G06F 11/1662 714/6.2 |
| 7,444,291 | B1 * | 10/2008 | Prasad | G06F 19/328 600/300 |
| 7,472,242 | B1 * | 12/2008 | Deshmukh | G06F 11/1451 711/162 |
| 7,603,529 | B1 | 10/2009 | MacHardy et al. | 711/162 |
| 7,840,536 | B1 * | 11/2010 | Ahal | G06F 17/30191 707/648 |
| 7,882,389 | B2 * | 2/2011 | Andres | G06F 11/2092 707/782 |
| 7,991,744 | B2 * | 8/2011 | Saha | G06F 17/30 707/648 |
| 8,296,637 | B1 * | 10/2012 | Varnica | H03M 13/1102 714/794 |
| 8,543,894 | B1 * | 9/2013 | Varnica | H03M 13/1102 714/794 |
| 8,812,678 | B2 * | 8/2014 | Bihani et al. | 709/226 |
| 2002/0091722 | A1 * | 7/2002 | Gupta | H04L 12/2602 |
| 2002/0129048 | A1 * | 9/2002 | Qiu | H04L 12/2602 |
| 2003/0061362 | A1 * | 3/2003 | Qiu | H04N 7/165 709/229 |
| 2004/0054939 | A1 * | 3/2004 | Guha | G06F 1/3203 713/300 |
| 2007/0050361 | A1 * | 3/2007 | Al-Masri | G06F 17/30616 |
| 2008/0052331 | A1 * | 2/2008 | Ogawa | G06F 3/0605 |
| 2008/0141321 | A1 * | 6/2008 | Kubat | H04N 7/17318 725/110 |
| 2008/0147821 | A1 * | 6/2008 | Dietrich | G06F 17/30206 709/216 |
| 2009/0271412 | A1 * | 10/2009 | Lacapra | G06F 17/30206 |
| 2009/0276771 | A1 * | 11/2009 | Nickolov | G06F 9/4856 717/177 |
| 2010/0332454 | A1 * | 12/2010 | Prahlad | G06F 17/3002 707/654 |
| 2011/0302137 | A1 * | 12/2011 | Dawkins | G06F 17/30159 707/640 |
| 2014/0250264 | A1 * | 9/2014 | Yano | G06F 12/0246 711/103 |

OTHER PUBLICATIONS

You, Lawrence L. "Efficient archival data storage." UCSC-SSRC—(2006): 06-04, pp. i-233 (250 total pages).*

Bhagwat et al.; "Providing High Reliability in a Minimum Redundancy Archival Storage System"; Proceedings of the 14th IEEE international Symposium on Modeling, Analysis, and Simulation; pp. 413-421, 2006.

* cited by examiner

SYSTEMS AND METHODS FOR IMPROVING STORAGE EFFICIENCY IN AN INFORMATION HANDLING SYSTEM

TECHNICAL FIELD

The present disclosure relates in general to information handling systems, and more particularly to systems and methods for improving storage efficiency in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may implement a data deduplication process to reduce the amount of data storage resources used to store a data set. In particular, the deduplication process identifies a common data portion or "chunk" that is substantially the same or identical for multiple data sets. The process subsequently stores the unique portions of the data sets and a copy of the common data portion between the multiple data sets. A sliding windows technique or other similar techniques may be used to define the address of the common data portion stored on the data storage resource, and pointers may be used to link the common data portion and the unique data portions. However, in the event the common data portion is corrupted or the storage device that stores the common data portion fails, all data files that link to the common data portion will also be corrupted.

SUMMARY

In accordance with the teachings of the present disclosure, the disadvantages and problems associated with storing deduped file portions have been reduced or eliminated. The information handling system may include a processor associated with a first storage resource and a plurality of second storage resources, where the first storage resource is more reliable than the plurality of second storage resources. The processor may be configured to determine a weight of a file portion, determine a number of copies of the file portion to be stored based at least on the determined weight, and store a copy of the file portion on the first storage resource if the determined number of copies of the file portion is greater than a predetermined storage threshold.

In certain embodiments, a method for improving storage efficiency of an information handling system is provided. The method may include determining a weight of a file portion for storage on a first storage resource or on one of a plurality of second storage resources, where the first storage resource is more reliable than the plurality of second storage resources. The method may further include determining a number of copies of the file portion to be stored based at least on the determined weight, and storing a copy of the file portion on the first storage resource if the determined number of copies of the file portion is greater than a predetermined storage threshold.

In other embodiments, an information handling system is provided. The information handling system may include a processor associated with a first storage resource and a plurality of second storage resources. The processor may be configured to determine a storage capacity of the first storage resource, compare the determined storage capacity of the first storage resource with a predetermined capacity threshold, determine a storage capacity of the plurality of second storage resources if the determined storage capacity of the first storage resource is greater than the predetermined capacity threshold, and determine an adjusted storage threshold if the determined storage capacity of the plurality second storage resources is less than the predetermined capacity threshold.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more communication interconnects buses) operable to transmit communication between the various hardware components. In some embodiments, an information handling system may be a distributed system that includes one or more instances of any and/or all of the components listed above.

Figure 1:
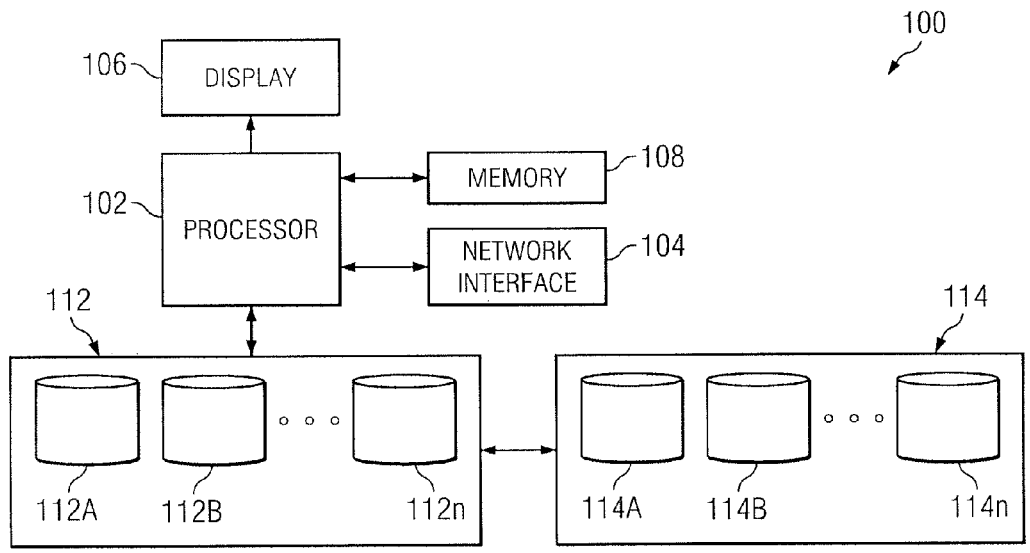
FIG. 1 illustrates a block diagram of an example information handling system for efficiently storing multiple data sets in accordance with certain embodiments of the present disclosure.

FIG. 1 illustrates a block diagram of an example information handling system 100 for efficiently storing multiple data sets in accordance with certain embodiments of the present disclosure. Information handling system 100 may include processor 102, network interface 104, display 106, memory 108, and storage resources 112 and 114.

Processor 102 may be any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 108, storage resources 112, 114, and/or another component of information handling system 100 and may output results, graphical user interfaces (GUIs), websites, and the like via display 106 or over network interface 104. It is noted that while FIG. 1 illustrates one processor 102, information handling system 100 may include multiple processors 102 configured to cooperatively interpret, execute program instructions, and/or process data.

Network interface 104 may be communicatively coupled to processor 102 and may be any system, device, or apparatus operable to provide one or more interfaces for communication between information handling system 100 and one or more networks. As an example and not by way of limitation, network interface 104 may include a network interface controller (NIC) or network adapter for communicating with an Ethernet or other wire-based network or a wireless NIC (WNIC) or wireless adapter for communicating with a wireless network, such as an OFDMA network. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. Information handling system 100 may include any suitable network interface 104 for any of these networks, where appropriate. Network interface 104 may include one or more network interfaces 104, where appropriate.

Display 106 may be communicatively coupled to processor 102. In some embodiments, display 106 may be any display device suitable for creating graphic images and/or alphanumeric characters recognizable to a user, and may include, for example, a liquid crystal display (LCD) or a cathode ray tube (CRT).

Memory 108 may be communicatively coupled to processor 102 and may include any system, device, or apparatus configured to retain program instructions and/or data for a period of time (e.g., computer-readable media). Memory 108 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 100 is turned off. In some embodiments, memory 108 may include a program of instructions that, when executed by a processor, e.g., processor 102, may improve storage efficiency in information handling system 100, in accordance with certain embodiments of the present disclosure.

Storage resources 112 and 114 may be communicatively coupled to processor 102 and may each include any instrumentality or aggregation of instrumentalities that may retain data and/or instructions for a period of time. In some embodiments, storage 112 and/or storage 114 may be integral to system 100. In other embodiments, storage 112 and/or storage 114 may be located remotely from information handling system 100.

While FIG. 1 illustrates storage resources 112 and 114, it is noted that more storage resources are contemplated. For example, two or more types of storage resources 112 and/or storage resources 114 may be implemented.

Storage resources 112 and 114 may include solid state disks, hard disk drives, magnetic tape libraries, optical disk drives, magneto-optical disk drives, compact disk drives, compact disk arrays, disk array controllers, and/or any computer-readable medium operable to store data. In some embodiments, storage resource 112 may be a more reliable (e.g., higher performance and/or higher cost) storage resource compared to storage resource 114. Reliability of a storage resource may depend on, for example, performance of the storage resource. Factors such as backup reliability (e.g., redundancy), maintaining data integrity, restorability, bit error rate (BER) analysis, mean time between failure (MTBF) analysis, annual failure rate (AFR), age, technology, I/O speed, etc., may be considered. Other factors that may be considered include the environment surrounding storage resource 112 and/or storage resource 114. For example, reliability may be based on the type of network connections, housing of the storage resources (e.g., data centers), battery or capacitance power supplies, servicing routines, etc. Other reliability factors may also be considered separately or combined with the example list provided herein.

In one embodiment, storage resource 112 may be more reliable than storage resource 114. For example, storage resource 112 may be a redundant storage resource (e.g., RAID array, solid state disk arrays, etc.) and storage resource 114 may be a non-redundant storage resource (e.g., commodity disks, server, hard disk drives, etc.). File portions with a greater importance (e.g., a common file portion that is associated with multiple data sets) may be stored on storage resource 112. In some embodiments, more than one copy of file portions with a greater importance (e.g., a common file portion associated with multiple data sets) may be stored on storage resource 112 in the event that one of the common file portions becomes corrupted such that the number of data sets affected is reduced or eliminated. Similarly, in other embodiments, file portions with a lesser importance (e.g., a unique file portion that is only associated with a single data set) may be stored on storage resource 114. In some embodiments, more than one copy of the unique file portions may be stored on storage resource 114 in case one of the unique file portions is corrupted.

Figure 2:
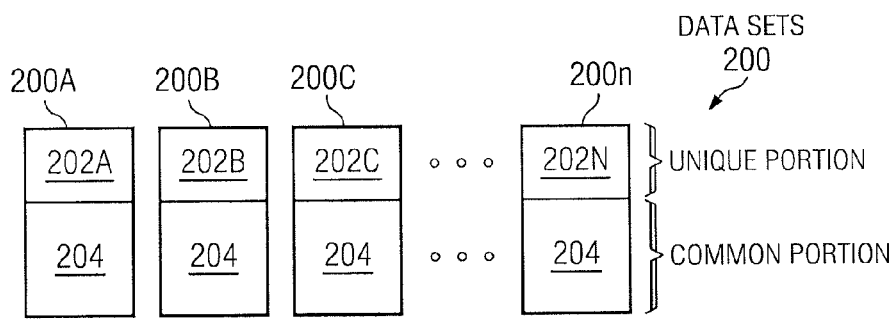
FIG. 2 illustrates example data sets including a common data portion in accordance with certain embodiments of the present disclosure.

In some embodiments, processor 102 may execute a program of instructions stored on memory 108 that are configured to determine the weight of one or more portions of a data file and store the file portions in one or more storage resources based on the determined weight (w) and/or a function of the determined weight. In operation, processor 102 may determine where to store file portions associated with multiple data sets. Referring to FIG. 2, multiple data sets 200, representative of data that may be stored on storage resources 112 or 114, are shown. Techniques known in the art such as, for example, a sliding window technique, a chunking technique, an in-line deduplication technique, a post-process deduplication technique, and/or other suitable techniques, may be implemented to determine unique portions 202 and common portion 204 of data sets 200. For each of unique portions 202 and common portion 204, processor 102 may determine an associated weight. In some embodiments, processor 102 may determine the weight of each portion using the following equation:

$$w = D/d \qquad \text{Eq. 1,}$$

where D is the size of all data that depends on the file portion and d is the size of the file portion, as described in the publication entitled "Providing High Reliability in a Minimum Redundancy Archival Storage System," by Deepavali Bhagwat et al. Additionally, the weight may be used to determine how many copies of the file portions should be on storage resources 112 and 114. For example, the number of copies of a particular file portion to be stored on storage resources 112 and 114 may be determined using the following equation:

$$f(w) = \min(\max(2, a + b \text{ low}(w)), k_{max}) \qquad \text{Eq. 2}$$

where k is the number of copies to be stored, a and b are constants that yield different storage space utilization, as described in the publication entitled "Providing High Reliability in a Minimum Redundancy Archival Storage System," by Deepavali Bhagwat et al.

Processor 102 may determine if a particular file portion should be stored on a more reliable storage resource (e.g., storage resource 112) or a less-reliable storage resource (e.g., storage resource 114) using a function g(f(w)). For example, the function g(f(w)) may be defined as:

$$g(f(w)) = \{1 \text{ if } f(w) >= x; f(w) \text{ if } f(w) < x\} \qquad \text{Eq. 3,}$$

where x is a predetermined storage threshold value set by a user and/or processor 102 that defines if a file portion is to be stored in a more reliable storage resource. In some embodiments, the predetermined storage threshold x may be determined by a user or may be dynamically adjusted by information handling system 100 as described in more detail below with respect to FIG. 4. In some embodiments, the predetermined storage threshold x may be determined based on the reliability and/or cost of the storage resources. For example, if storage resource 112 is four (4) times more reliable than storage resource 114, the predetermined storage threshold may be set to a certain value, e.g., '4'. In the same or alternative embodiments, the cost of a storage resource may also be factored into determining the predetermined storage threshold x. For example, if storage resource 112 is four (4) times more reliable and the cost is three (3) times more than storage resource 114, predetermined storage threshold x may be set to a value that may provide the appropriate level of reliability and cost effective.

It is noted that other factor(s) may also be considered when setting the predetermined storage threshold including, for example, the type of the storage resources, performance of the storage resources, etc. In the same or alternative embodiments, system configuration including, for example the configuration of information handling system 100 (e.g., network connections, housing of the storage resources (e.g., data centers), battery or capacitance power supplies, servicing routines), the storage resource configuration (e.g., number of storage resources 112 and/or number of storage resources 114, the type of storage resources 112 and/or 114, etc.), and/or other configurations are contemplated. The following example illustrates how using the predetermined storage threshold x, set to, for example '4', may provide the needed storage reliability for a particular file portion.

In some embodiments, the number of copies to be stored as determined by f(w) is greater than or equal to x, then the output of g(f(w)) is '1' indicating, for example, that the file portion is a common file portion associated with multiple data sets. In this case, processor 102 may store at least one copy of the file portion on the more reliable storage resource. As an example, if the predetermined storage threshold x is set to four (4), indicating, for example, that storage resource 112 is four times more reliable that storage resource 114, any file portions that require four (4) or more copies stored on a storage resource may automatically be stored on more reliable storage (e.g., storage resource 112). In one embodiment, one (1) copy of the file portion may be stored on storage resource 112. By storing at least one (1) copy on storage resource 112, the appropriate level of reliability for the particular file portion is achieved.

Similarly, if the number of copies to be stored as determined by f(w) is less than x, the output of g(f(w)) is f(w) indicating, for example, that the file portion is less important compared to file portions with f(w) that is greater than the predetermined storage threshold x. In this case, processor 102 may store the number of copies of the file portion determined by f(w) on the less reliable storage resource (e.g., storage resource 114). For example, if the predetermined storage threshold x is set to '4', and the output of f(w) is '3', three (3) copies of the file portion may be stored on storage resource 114. In one embodiment, a first copy may be stored on a first one of storage resource 114, a second copy may be stored on second one of storage resource 114, and a third copy may be stored on a third of storage resource 114. By storing the number of copies as determined by f(w) on storage resources 114, the appropriate level of reliability may be achieved. Additionally, storing the multiple copies of the file portions on storage resource 114 may be more cost effective than storing one (1) copy of the file portion on storage resource 112.

In some embodiments, processor 102 may adjust the predetermined storage threshold x such that storage resources 112 and 114 are evenly utilized. In some embodiments, the adjustment of the predetermined storage threshold x may be based at least on the amount of used storage space on storage resource 112 and/or storage resource 114. For example, if a predetermined capacity threshold y is set to, for example, 75%, processor 102 may assess the storage space of storage resource 112. Processor 102 may determine the amount of used storage space on storage resource 112. If the used storage space on storage resource 112 is greater than the predetermined capacity threshold, e.g., more than 75% of storage resource contains stored data, processor 102 may determine the amount of used storage space on storage resource 114. If the used storage space on storage resource 114 is less than the predetermined capacity threshold y, processor 102 may adjust the predetermined storage threshold x, allowing more file portions to be stored on storage resource 114. In some embodiments, the predetermined storage threshold x may be increased such that more copies of a file portion are stored in storage resource 114. Only file portions whose function f(w) is greater than or equal to the increased storage threshold may be stored on storage resource 112.

Similarly, processor 102 may determine if the amount of used storage space on storage resource 114 is greater than the predetermined capacity threshold y. If the used storage space on storage resource 114 is greater than the predetermined capacity threshold y, processor 102 may evaluate the amount of used storage space on storage resource 112. In some embodiments, processor 102 may adjust the predetermined storage threshold x if the used storage space of storage resource 112 is less than the predetermined capacity threshold y. The adjustment of the predetermined storage threshold x allows more file portions to be stored in the more available storage resource, in this embodiment, storage resource 112. Once the predetermined storage threshold x is adjusted, file portions, such as unique file portions 204 and common file portion 202, may be evaluated and moved to an appropriate storage resource as described in more detail with respect to FIG. 3.

In some embodiments, if the total amount of used storage space on storage resources 112 and 114 is greater than the predetermined capacity threshold y, processor 102 may provide a notice to a user via, for example, display 106 indicating the status of the storage resource(s). For example, processor 102 may provide the percentage of storage resource being used, recommend one or more types of storage resource needed, etc.

Figure 3:
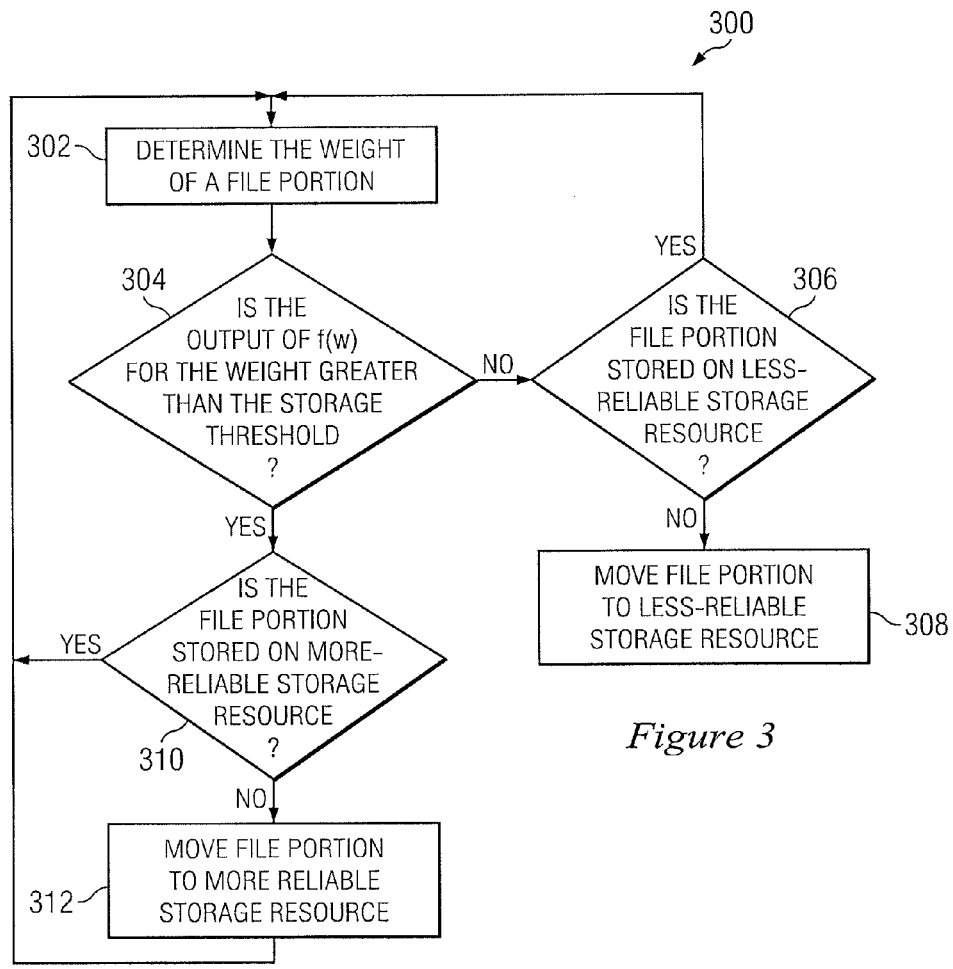
FIG. 3 illustrates a method for improving storage efficiency in an information handling system in accordance with certain embodiments of the present disclosure.

FIG. 3 illustrates a method 300 for improving storage efficiency of an information handling system in accordance with certain embodiments of the present disclosure. At step 302, processor 102 may determine the weight w of a file portion, the number of copies f(w) of the file portion that should be stored based on the weight and where the file portion should be stored g(f(w)), e.g., on either more reliable storage resource or less reliable storage resource, based on the number of copies f(w).

At step 304, processor 102 may determine if the output of f(w) for a given weight w is less than a predetermined storage threshold x. In some embodiments, by comparing the output of f(w) (e.g., the number of copies of a file portion to store) to the predetermined storage threshold x, the importance of the file portion may be determined. If the output of f(w) for the given weight is less than the predetermined storage threshold x, method 300 may proceed to step 306. If the output of f(w) for the given weight is greater than or equal to the predetermined storage threshold x, method 300 may proceed to step 310.

At step 306, processor 102 may determine if the file portion is currently stored in a less reliable storage resource, e.g., storage resource 114. If the file portion is currently stored in storage resource 114, method 300 may return to step 302 to evaluate other file portions. If the file portion is not stored in storage resource 114, method 300 may proceed to step 308, where the file portion is moved to storage resource 114.

At step 310, processor 102 may determine if the file portion is currently stored on a more reliable storage resource, such as storage resource 112. If the file portion is stored on the more reliable storage resource, method 300 may proceed to step 302 to evaluate other file portions. If the file portion is not stored on the more reliable storage resource, method 300 may proceed to step 312, where the file portion is moved to storage resource 112.

Some or all of steps 302 through 312 may be repeated for some or all file portions of data sets 200. In particular, the importance of certain file portions may change (e.g., a once-unique file portion is now a common portion for multiple data sets 200), and thus, the file portions that have a greater importance may be moved to a more reliable storage resource such that the integrity of the file-portion may be preserved. For example, if a previously unique portion 202 now has multiple data sets that depend on the unique portion, the unique portion 202 may be stored in the more reliable storage resource. In some embodiments, method 300 may dynamically assess the file portions stored in storage resource 112 and/or 114 and may move file portions based at least on the number of copies to be stored of the file portion.

While FIG. 3 contemplates one of a first type of storage resource and one of a second type of storage resource, it is noted that more than one of each type may be used in information handling system 100. For example, information handling system 100 may include at least one storage resource 112 and multiple storage resources 114. Processor 102 may be configured to store each copy of the determined number of copies on one of multiple storage resources 114 storage resources if the output of f(w) is less than the predetermined storage threshold x.

Figure 4:
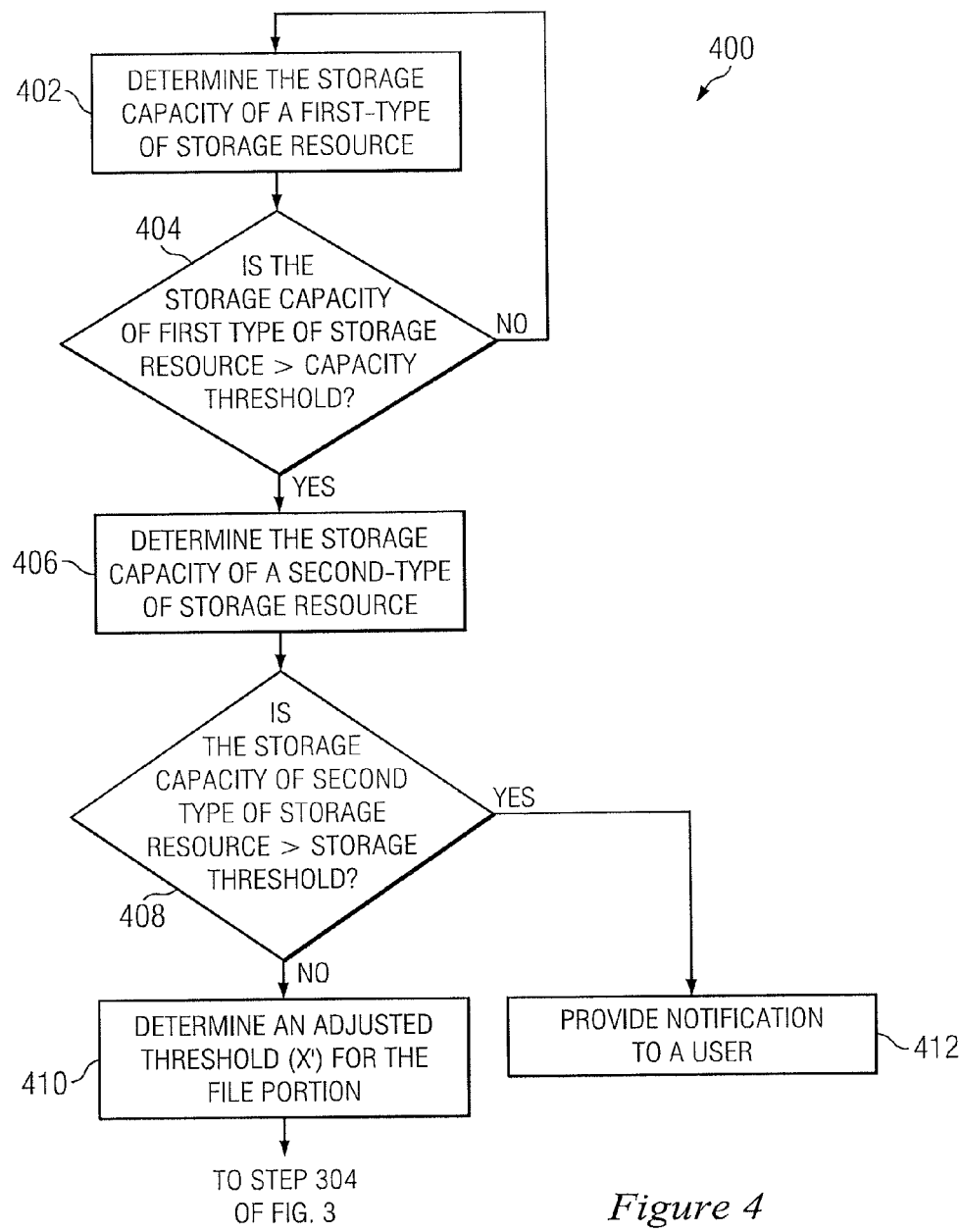
FIG. 4 illustrates a method for adjusting a storage threshold based on a storage capacity of storage resource(s) associated with an information handling system in accordance with certain embodiments of the present disclosure.

FIG. 4 illustrates a method 400 for adjusting the predetermined storage threshold x based at least on the amount of used storage space on storage resource 112 and/or storage resource 114 in accordance with certain embodiments of the present disclosure. At step 402, processor 102 may determine the amount of used storage space (also referred to as "the storage capacity") of a first type of storage resource. At step 404, processor 102 may determine if the storage capacity of the first type of storage resource (e.g., more reliable storage resource 112) is greater than the predetermined capacity threshold y. If the storage capacity of storage resource 112 is less than the predetermined capacity threshold y, method 400 may return to step 402 to evaluate the storage capacity of storage resource 112 at a later time. In some embodiments, processor 102 may dynamically assess the amount of used storage space on storage resources 112 and 114. In other embodiments, processor 102 may determine the amount of used storage space on storage resources 112 and 114 at a predetermined interval. If the storage capacity of storage resource 112 is greater than the predetermined capacity threshold y, method 400 may proceed to step 406 to determine the storage capacity of a second type of storage resource.

At step 408, if the storage capacity of the second type of storage resource (e.g., less reliable storage resource 114) is less than the predetermined capacity threshold y, method 400 may proceed to step 410. Otherwise, if the storage capacity of storage resource 114 is greater than the predetermined capacity threshold y, method 400 may proceed to step 412.

At step 410, if the storage capacity of storage resource 114 is less than the predetermined capacity threshold y, processor 102 may determine an adjusted storage threshold x' for file portions, which may limit the number of file portions that can be stored on storage resource 112. The adjusted storage threshold x' may be used in step 304 of FIG. 3.

At step 412, if the storage capacity of storage resource 114 is greater than the predetermined capacity threshold y, indicating that the storage capacity of both storage resource 112 and 114 is greater than the predetermined capacity threshold y, processor 102 may provide a notification to a user indicating the status of storage resource 112 and/or 114. In some embodiments, processor 102 may report the amount of used storage space on storage resources 112 and/or 114, provide a recommendation of the types (e.g., more reliable or less reliable storage resources) or number of storage resources needed, etc. via, for example, display 106 coupled to processor 102.

In some embodiments, the user may add new storage resources to information handling system 100 based at least on the notification provided to the user. When the new storage resources are added, processor 102 may score each of the available storage resources. For example, if the user adds a new storage resource, processor 102 may determine which of the available storage resources (e.g., storage resource 112, storage resource 114, and the newly added storage resource(s)) is more reliable and provide a score for each available storage resources. In some embodiments, the score may indicate the reliability of the storage resource. The score may be used in conjunction with, for example, the steps 302-306 to determine where to move a particular file portion.

The present disclosure provides, for example, systems and methods for storing important file portions such as common file portion 204 that is associated with multiple data sets on storage resources that provide greater reliability (e.g., storage resources that provide RAID protection, storage resources with greater mean time between failure rates, and/or storage resources with lower hard error rates). Similarly, the systems and methods of the present disclosure may allow for the storage of multiple copies of file portions with lower importance (e.g., unique file portions 202 that are associated with a single data set) on storage resources with lesser reliability (e.g., storage resources without RAID protection).

The present disclosure further provides for techniques to store file portions when additional storage resources are introduced to information handling system 100. For example, information handling system 100 may be updated over time with newer, more reliable components, storage resources, better RAID algorithms, etc. Techniques of the present disclosure may be implemented such that processor 102 may assign a score to the current and newly-introduced storage resource based on the reliability of the storage resource and implement a method, such as method 300 of FIG. 3 to store file portions on the appropriate storage resource based at least on the determined weight of the file portion.

The present disclosure further provides reliable storage of data with a significantly lower number of drives. By efficiently storing data portions that have multiple dependencies, e.g., common portions, in a more reliable storage resource, the number of drives needed is reduced, thus reducing power consumption, space, etc., while maintaining data integrity.

Although the figures and embodiments disclosed herein have been described with respect to information handling systems, it should be understood that various changes, substitutions and alternations can be made herein without departing from the spirit and scope of the disclosure as illustrated by the following claims.

What is claimed is:

1. An information handling system including an increased storage efficiency, comprising:
    a first storage resource and a plurality of second storage resources, wherein a reliability of the first storage resource is greater than a reliability of each of the plurality of second storage resources, the reliability based on a reliability factor; and
    a processor associated with the first storage resource and the plurality of second storage resources, wherein the processor is configured to:
        determine a weight of a file portion;
        determine a number of copies of the file portion to be stored based at least on the determined weight;
        determine a storage capacity of the first storage resource;
        compare the determined storage capacity of the first storage resource with a predetermined capacity threshold;
        determine a storage capacity of the plurality of second storage resources when the determined storage capacity of the first storage resource is greater than the predetermined capacity threshold;
        determine an adjusted storage threshold when the determined storage capacity of the plurality of second storage resources is less than the predetermined capacity threshold; and
        store a copy of the file portion on the first storage resource when the determined number of copies of the file portion is greater than a predetermined storage threshold;
    wherein the reliability factor includes at least one of data integrity, restorability, bit error rate analysis, mean time between failure analysis, annual failure rate, age, and speed of the storage resource.

2. The information handling system of claim 1, wherein the first storage resource includes a redundant storage resource and each of the plurality of second storage resources includes a non-redundant storage resource.

3. The information handling system of claim 1, wherein the file portion is a common file portion that is similar for a plurality of data sets.

4. The information handling system of claim 1, wherein the processor is further configured to store each copy of the determined number of copies on a different one of the plurality of second storage resources when the determined number of copies of the file portion is less than the predetermined storage threshold.

5. The information handling system of claim 4, wherein the predetermined storage threshold is determined based on at least one of:
    a first storage resource reliability of the first storage resource;
    a second storage resource reliability of the plurality of second storage resources;
    a first storage resource performance of the first storage resource;
    a second storage resource performance of the plurality of second storage resources;
    an information handling system configuration; and
    a configuration of the first storage resource and the plurality of second storage resources.

6. The information handling system of claim 1, wherein the predetermined storage threshold is adjusted based on a storage capacity of at least one of:
    the first storage resource; and
    at least one of the plurality of second storage resources.

7. A method for improving storage efficiency of an information handling system, comprising:
    determining by a processor a weight of a file portion for storage on a first storage resource or at least one of a plurality of second storage resources, wherein a reliability of the first storage resource is greater than a reliability of each of the plurality of second storage resources, the reliability based on a reliability factor;
    determining by the processor a number of copies of the file portion to be stored based at least on the determined weight;
    determining a storage capacity of the first storage resource;
    comparing the determined storage capacity of the first storage resource with a predetermined capacity threshold;
    determining a storage capacity of the plurality of second storage resources when the determined storage capacity of the first storage resource is greater than the predetermined capacity threshold;
    determining an adjusted storage threshold when the determined storage capacity of the plurality of second storage resources is less than the predetermined capacity threshold; and storing by the processor a copy of the file portion on the first storage resource if the determined number of copies of the file portion is greater than a predetermined storage threshold;

wherein the reliability factor includes at least one of data integrity, restorability, bit error rate analysis, mean time between failure analysis, annual failure rate, age, and speed of the storage resource.

8. The method of claim 7, wherein the file portion is a common file portion that is similar for a plurality of data sets.

9. The method of claim 7, further comprising storing each copy of the determined number of copies of the file portion on a different one of the plurality of second storage resources when the determined number of copies of the file portion is less than the predetermined storage threshold.

10. The method of claim 9, further comprising determining the predetermined storage threshold based at least on one of:
   a first storage resource reliability of the first storage resource;
   a second storage resource reliability of the plurality of second storage resources;
   a first storage resource performance of the first storage resource;
   a second storage resource performance of the plurality of second storage resources;
   an information handling system configuration; and
   a configuration of the first storage resource and the plurality of second storage resources.

11. An information handling system, comprising:
   a first storage resource and a plurality of second storage resources, wherein a reliability of the first storage resource is greater than a reliability of each of the plurality of second storage resources, the reliability based on a reliability factor; and
   a processor associated with the first storage resource and the plurality of second storage resources, wherein the processor is configured to:
   determine a weight of a file portion;
   determine a number of copies of the file portion to be stored based at least on the determined weight;
   determine a storage capacity of the first storage resource;
   compare the determined storage capacity of the first storage resource with a predetermined capacity threshold;
   determine a storage capacity of the plurality of second storage resources when the determined storage capacity of the first storage resource is greater than the predetermined capacity threshold;
   determine an adjusted storage threshold when the determined storage capacity of the plurality of second storage resources is less than the predetermined capacity threshold; and
   store a copy of the file portion on the first storage resource when the determined number of copies of the file portion is greater than the adjusted storage threshold;

wherein the reliability factor includes at least one of data integrity, restorability, bit error rate analysis, mean time between failure analysis, annual failure rate, age, and speed of the storage resource.

12. The information handling system of claim 11, wherein the processor is further configured to provide a notification to a user when the determined storage capacity of the plurality of second storage resources is greater than the predetermined capacity threshold.

13. The information handling system of claim 12, wherein the notification includes at least one of:
   the storage capacity of the first storage resource;
   the storage capacity of one or more of the plurality of second storage resources;
   a recommendation to the user to add a new storage resource to the information handling system; and
   a storage type for the new storage resource.

14. The information handling system of claim 13, wherein the processor is further configured to provide a score for each of the new storage resource, the first storage resource, and the plurality of second storage resources when the user adds the new storage resource to the information handling system.

15. The information handling system of claim 11, wherein the file portion is a common file portion that is similar for a plurality of data sets.

16. The information handling system of claim 11, wherein the processor is further configured to store each copy of the determined number of copies of the file portion on a different one of the plurality of second storage resources when the determined number of copies of the file portion is less than the adjusted storage threshold.

17. The information handling system of claim 16, wherein the predetermined storage threshold is determined based on at least one of:
   a first storage resource reliability of the first storage resource;
   a second storage resource reliability of the plurality of second storage resources;
   a first storage resource performance of the first storage resource;
   a second storage resource performance of the plurality of second storage resources;
   an information handling system configuration; and
   a configuration of the first storage resource and the plurality of second storage resources.

* * * * *